United States Patent
Beard et al.

Patent Number: 5,584,605
Date of Patent: Dec. 17, 1996

[54] ENHANCED IN SITU HYDROCARBON REMOVAL FROM SOIL AND GROUNDWATER

[76] Inventors: Barry C. Beard, 15202 Paladora, Houston, Tex. 77083; Jerry R. Gips, 3609 Tangley, Houston, Tex. 77005; Stewart Haynes, Jr., 5667 Ella Lee La., Houston, Tex. 77056-4022; Joseph F. Long, 1335 Lost Creek Blvd., Austin, Tex. 78746; Thomas A. Harlan, 8800 Feathenhill Rd., Austin, Tex. 78737

[21] Appl. No.: 496,454

[22] Filed: Jun. 29, 1995

[51] Int. Cl.⁶ .............................. B09C 1/08; E21B 43/40
[52] U.S. Cl. .................. 405/128; 166/50; 166/266; 210/747
[58] Field of Search ................ 405/128; 210/747; 166/50, 266

[56] References Cited

U.S. PATENT DOCUMENTS

| | | | |
|---|---|---|---|
| 4,611,950 | 9/1986 | Russomano | 405/128 |
| 4,832,122 | 5/1989 | Corey et al. | 166/266 |
| 4,842,448 | 6/1989 | Koerner et al. | 405/258 |
| 5,161,914 | 11/1992 | Rahn et al. | 405/128 |
| 5,169,263 | 12/1992 | Johnson et al. | 405/128 |
| 5,221,159 | 6/1993 | Billings et al. | 405/128 |
| 5,252,226 | 10/1993 | Justice | 405/128 X |
| 5,265,978 | 11/1993 | Losack | 405/128 |
| 5,286,140 | 2/1994 | Mather | 405/128 |
| 5,383,747 | 1/1995 | Millan | 405/128 |
| 5,472,294 | 12/1995 | Billings et al. | 405/128 |

*Primary Examiner*—George A. Suchfield
*Attorney, Agent, or Firm*—Joseph F. Long

[57] ABSTRACT

The invention encompasses a process and equipment for an aggressive approach to remediation of specific hydrocarbon contaminated soil and groundwater using horizontal sparging pipes in or below the contamination with a matrix of vertical pipes that act to conduct sparger gas with associated hydrocarbons to the surface for hydrocarbon removal before recycle and also to collect and strip hydrocarbons washed horizontally into the collector pipes by injection of a washing fluid through a matrix of vertical wash pipes spaced between the collector pipes.

6 Claims, 2 Drawing Sheets

5,584,605

ENHANCED IN SITU HYDROCARBON REMOVAL FROM SOIL AND GROUNDWATER

BACKGROUND OF THE INVENTION

There continues to be a need for removal of hydrocarbon contamination both in soil and in ground water. "Pump and treat" or pumping ground water to the surface and treating has been shown to relatively slow and expensive. In situ air sparging has been shown to require extended periods of time for sufficient removal. The objectives of this invention include in situ removal from both the underlying ground water and the soil above in minimum time with lowest overall cost.

There appears to be a specific need for removal of hydrocarbons such as gasoline from the soil and in some cases the groundwater below valuable real estate sites such as filling stations, railyards etc. . . . .

The major objective of this invention is to provide a relatively low cost time predictable method for in situ hydrocarbon removal from groundwater and soil.

The closest prior art we have found is U.S. Pat. No.4, 832,122 to Corey et al issued May 23,1989. Our invention is similar in that we plan to use multiple pipes installed using horizontal drilling techniques for sparging below the contaminated zone. We differ significantly as follows a) we use a multiplicity of perforated vertical pipes to collect the sparger gas and the hydrocarbon associated therewith, b) we use a multiplicity of perforated vertical wash pipes spaced between the perforated vertical collector pipes to wash the soil to free hydrocarbons before they reach the groundwater; hydrocarbons and wash water or wash solution entering the collector pipes will be hydrocarbon stripped as the mixture falls downward,or may be entrained to the surface for normal treatment either by the sparging gas or by an auxiliary small pipe carrying an entrainment gas inserted in the collector, c) we use carbon dioxide as the sparging gas;

d) we determine approximate quantity of the contaminant by drilling and sampling;

e) we monitor the removal of the hydrocarbon and flow rate of the influent carbon dioxide or stripping gas and from this data may vary flow for maximum economic efficiency;

f) we pull a slight vacuum continuously on the collection header to speed the remediation;

e) we may calculate probable clean -up time from a semilog graph of effluent hydrocarbon contamination versus time.

g) with excessive clean up times indicated we may augment the recovery system.

BRIEF SUMMARY OF THE INVENTION

The invention comprises a) determining the depth and extent of the contaminated zone by drilling and sampling, b) installing perforated pipes horizontally below the contaminated zone and in the ground water table;

c) installing a matrix of vertical perforated collector pipes on about eight foot centers or further apart dependant upon the geology of the zone, from the ground surface to just above the watertable or groundwater;

d) installing a matrix of vertical perforated wash pipes between said collector pipes;

e) injecting an environmentally innocuous wash solution such as water, water plus carbon dioxide, water plus an inorganic salt such as sodium sulfate,water plus detergent etc. to displace hydrocarbon contaminants to flow toward and into said collector pipes;

f) sparging a stripping gas such as air, nitrogen, or carbon dioxide with carbon dioxide being preferable through said horizontal sparging pipes, g) headering together the above ground ends of the collector pipes and pulling a slight vacuum in the collector pipes using a pump such as a Roots-Connersville blower, h) discharging the blower through a water knock out pot, and through a hydrocarbon removal system such as an activated charcoal bed and recycling back to continue sparging the formation, i) continuing the operation with sampling of the gas in the collector header to determine indicated clean-up, j) determining site clean up by sampling and analysis of the groundwater and the soil;

k) pumping oil digesting microbes through the wash tubes for final clean up of the hydrocarbon contaminant.

DETAILED DESCRIPTION OF THE INVENTION

The invention comprises equipment and process to aggressively approach the clean up of specific hydrocarbon contaminated sites wherein contamination may have reached or entered the ground water. The process may be varied for specific sites. If the ground water is contaminated perforated pipes running horizontally below the contaminant plume are used to sparge a stripping gas such as air,nitrogen, carbon dioxide,ozone or mixtures of thereof through the groundwater and upward to collection pipes. Carbon dioxide is normally the preferred stripping gas. Vertical perforated collection pipes that may be about one and one half to two inches in diameter and spaced a minimum of about eight feet apart in a grid or matrix throughout the specific site to allow use of a similar grid of wash pipes to wash or extract the soil. The wash fluid should preferentially enter the collection pipes since our process maintains a slight negative pressure in the collection pipes. In this manner the wash water with associated hydrocarbon is stripped by the gas being sparged through the ground water. If the contamination has not reached the groundwater the perforated horizontal sparging pipes are placed below the contaminated zone in the soil and the ends of the collection pipes are above the sparger pipes. The process still works as outlined.

Figure 1:
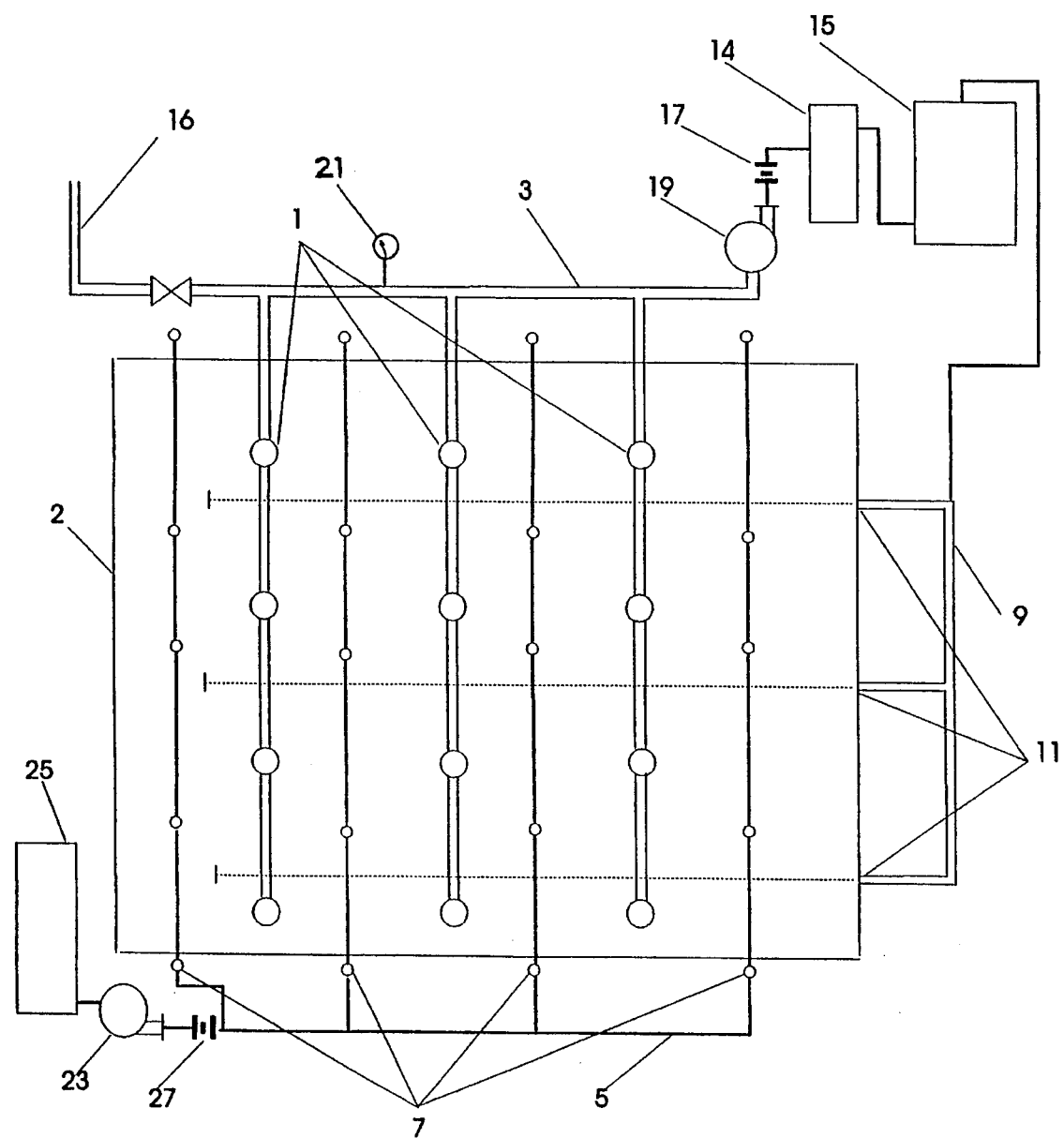
FIG. 1 we've shown a top view of a contaminated site indicating possible equipment layout and relative locations of the washing and collector pipes or wells.

The process and necessary equipment may be best be described from the drawings. In FIG. 1 we've shown a specific site 2 with multiple collection pipes 1 headered together to form header 3. Blower 19, which is preferably a type similar to Roots-Connersville blower, takes suction from header 3 and should have sufficient capacity to hold a negative pressure in the header 3 as indicated by pressure gauge 21. Blower 19 continuously pumps through flowmeter 17 to water knockout pot 14 and, in this embodiment through an activated charcoal absorber 15 to remove the hydrocarbons in the gas stream. Many other type hydrocarbon removal systems would be known to those of normal skill in the art and would be equally useable. The gas stream is recycled through sparger header 9 and perforated sparging pipes 11.The sparger pipes 11 lead downward and turn to be horizontally below the hydrocarbon contaminated zone and if the groundwater is contaminated into or below the contaminated groundwater under the specific site 2. There may be different levels of the sparger pipes dependant upon the particular site; some may be deep enough to be under the groundwater and some may be just below the hydrocarbon contaminated soil depending upon the extent and location of the contamination.

Stripping gas makeup comes from storage, not shown, through line 16.

A matrix of closed end perforated wash pipes 7 that may be about one inch in diameter are equidistantly spaced between the collection pipes 1.The wash pipes are connected to form header 5. Pump 23 which takes suction from wash tank 25 pumps through flowmeter 27 and header 5 to wash pipes 7. The rate of pumping will depend upon geology and contamination of a particular site.

Figure 2:
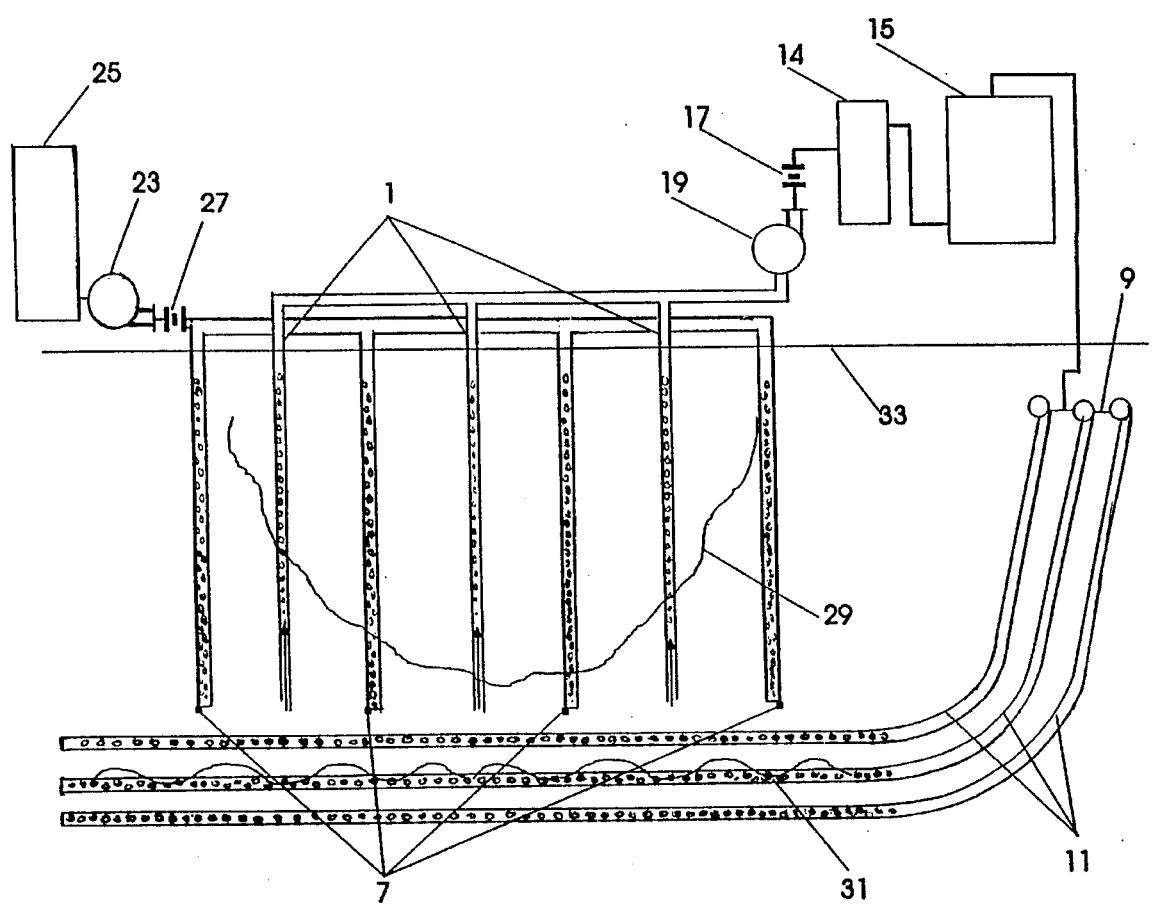
In FIG.2 we've shown a side view indicating one dimensional view of equipment and piping.

In FIG. 2 we've shown a side view of the system with sparger pipes 11 leading from header 9 which may be below ground level 33 with the sparger pipes 11 shown at different levels. The levels chosen would depend on geology and contamination extent 29 and/or contamination extent in groundwater 31 as shown by sampling and analysis. Collector pipes 1 and wash pipes 7 would have relative positions as shown with other parts of the system functioning as discussed. The system is intended to have the path of least resistance for the washing fluid to be from wash pipes 7 sideways to the perforated collector tubes 1.With the washing fluid and associated hydrocarbons entering the collector tubes or pipes in this manner the hydrocarbons should be stripped easily from the mixture or the mixture could be entrained to the surface. The washing fluid used would be varied with the type of soil and the geology of the underground structure. We foresee that carbon dioxide under some pressure with water as well as water plus detergent, water alone, water plus an inorganic salt and water plus agents used to aid in displacing hydrocarbons from soil such as detergents may all be useful to gain rapid site cleanup.

When by analysis the site appears to be near final cleanup or when the clean up as outlined is not proceeding satisfactorily the wash wells may be utilized to pump oil digesting microbes with proper nutrients into the contaminated area. This may done to augment the systems outlined.

What is claimed is:

1. A process for in situ hydrocarbon removal from soil and groundwater comprising:

a) sparging a stripping gas through a multiplicity of outlets in horizontal pipes located beneath the surface of said groundwater;

b) collecting said stripping gas and said hydrocarbons associated therewith in a multiplicity of open ended perforated vertical pipes;said vertical pipes being headered together on a beginning end and having said open ends above said groundwater;

c) washing said hydrocarbons from said soil by injecting a wash fluid containing carbon dioxide into a multiplicity of perforated closed end vertical pipes centrally located between said multiplicity of open ended perforated pipes;

d) recycling said stripping gas through a knockout pot to remove water and through an activated charcoal means to remove said hydrocarbons and back through said horizontal pipes to continue stripping.

2. A process for in situ hydrocarbon removal from soil and groundwater as in claim 1 wherein said wash fluid contains a detergent.

3. A process for in situ hydrocarbon removal from soil and groundwater as in claim 1 wherein said stripping gas is carbon dioxide.

4. Apparatus for in situ hydrocarbon removal from soil and groundwater in a specific area comprising a) a minimum of three sparging pipes connected together at a beginning end to form a sparging header and extending downward and curving to run horizontally through the surface of said groundwater below said specific area; said sparging pipes being perforated throughout the horizontal run;

b) a matrix of perforated vertical open ended collector pipes spaced a minimum of eight feet apart throughout said specific area and headered at a beginning end to form a collector header with each of said collector pipes extending downward to just above said groundwater;

c) a matrix of perforated vertical closed end wash pipes equidistantly spaced between said collector pipes and headered together at a beginning end and extending downward to approximately ten feet above said groundwater;

d) a fluid storage tank and a pump means, said pump means taking suction from said storage tank and activatable to inject said fluid from said storage tank into said closed end wash pipes through said header, e) a stripping gas pump means, a water knockout pot, and a hydrocarbon removal system with said stripping gas pump means connecting on a suction side to said collector header and acting to pull a slight vacuum in said header while pumping through said knockout pot, through said hydrocarbon removal system and back through said gas sparger header to continuously recycle said stripping gas.

5. Equipment for in situ hydrocarbon removal from soil and groundwater in a specific-area as in claim 4 wherein said hydrocarbon removal system comprises an activated charcoal bed.

6. Apparatus for in situ hydrocarbon removal from soil in a specific area comprising a) a minimum of three sparging pipes connected together at a beginning end to form a sparging header and extending downward and curving to run horizontally through said soil below said hydrocarbon in said soil in said specific area; said sparging pipes being perforated throughout the horizontal run;

b) a matrix of perforated vertical open ended collector pipes spaced a minimum of eight feet apart throughout said specific area and headered at a beginning end to form a collector header with each of said collector pipes extending downward to just above said sparging header;

c) a matrix of perforated vertical closed end wash pipes equidistantly spaced between said collector pipes and headered together at a beginning end and extending downward to approximately ten feet above said sparging pipes;

d) a fluid storage tank and a pump means, said pump means taking suction from said storage tank and activatable to inject said fluid from said storage tank into said closed end wash pipes through said header, e) a stripping gas pump means, a water knockout pot, and a hydrocarbon removal system with said stripping gas pump means connecting on a suction side to said collector header and acting to pull a slight vacuum in said header while pumping through said knockout pot, through said hydrocarbon removal system and back through said gas sparger header to continuously recycle said stripping gas.

* * * * *